March 24, 1936.  O. CHRISTOFFERSEN  2,034,973
STRAP FASTENER
Filed Nov. 26, 1934
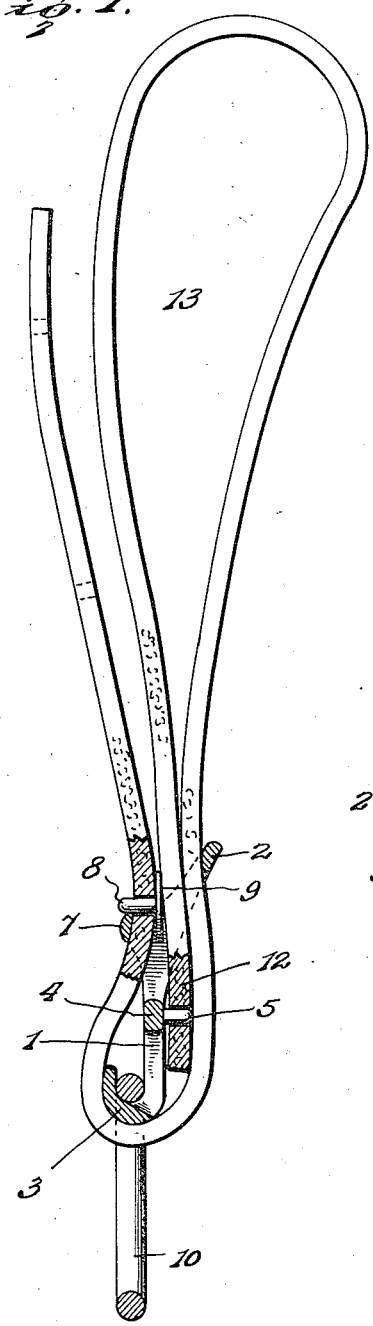
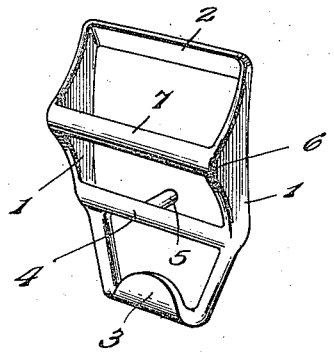
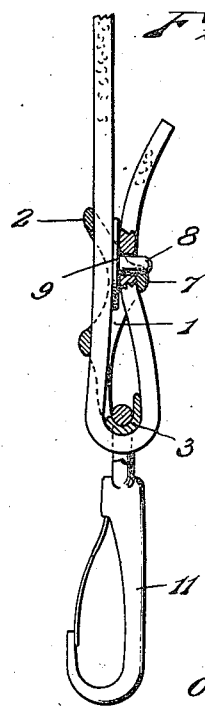
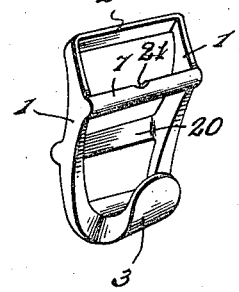
Inventor
Otto Christoffersen.
By Lacey & Lacey,
Attorneys Patented Mar. 24, 1936

2,034,973

UNITED STATES PATENT OFFICE 2,034,973

STRAP FASTENER

Otto Christoffersen, Herman, Nebr.

Application November 26, 1934, Serial No. 754,902

3 Claims. (Cl. 24—176)

This invention is a strap fastener applicable to harness and other straps and the object is to provide a simple device which may be easily applied or released and which will effectually fasten the strap when applied. The invention is illustrated in the accompanying drawing and consists in certain novel features which will be first fully described and then particularly defined in the claims.

In the drawing:

Fig. 1 is a view showing the fastener in longitudinal section and a double strap held thereby, the strap being partly in elevation and partly in section, Fig. 2 is a perspective view of the fastener frame, Fig. 3 is a view similar to Fig. 1 but showing a simpler form of the device, Fig. 4 is a perspective view of the frame seen in Fig. 3.

As shown in Figs. 1 and 2, the fastener comprises an integral frame having side bars 1 connected at one end by a cross bar 2 and converging slightly at the opposite end and united by a hook 3. Between their ends, the side bars are connected by a cross bar 4 having a stud 5 projecting therefrom at the opposite side from the hook and it will be observed that the portions of the side bars between the cross bars 2 and 4 extend at an angle to the portions of the side bars between the bar 4 and the hook, the hook and the bar 2 being at opposite sides of a plane passing through the bar 4 and the lower portions of the side bars in Fig. 1. Between the cross bars 2 and 4, the side bars are expanded, as shown at 6, and a cross bar 7 connects the edges of the expanded portions. The fastener is completed by a loose stud 8 having a flat relatively large head 9.

In the form shown in Figs. 3 and 4, the stud 5 is omitted and the frame is shorter with less space between the cross bars 2 and 7 than in the first-described form. It may also be noted that in Fig. 1 and 2 the hook is designed to be engaged with a ring 10, while in Figs. 3 and 4 the hook is designed to be engaged in the rectangular loop of a snap hook 11 but, in actual practice, the hook in both forms will be designed according to the shape of the element with which it is to be engaged. A bar 20 is substituted for the bar 4 and is located on the same side of the side bars as the cross bar 2 so that the strap is held down and will not slide too freely. The head of the stud is slightly under the bar 2 to avoid tilting and the bar 7 has a notch 21 in one edge in which the end of the stud seats.

In the use of the device as shown in Fig. 1, one end of the strap 12 is passed through the space between the bars 2 and 7 and the stud 5 is engaged in an opening in the strap. The strap is then folded to form the loop 13, the size of which will be determined by the use to which the strap is put, and the free end of the strap is then passed between the bar 2 and the secured end of the strap, across the stud 5, through the ring 10, and around the hook 3, and then between the bar 7 and the first mentioned strap end. The stud 8 is then engaged in an opening in the free end portion of the strap with the head of the rivet between the adjacent plies of the strap. When the loop is subjected to the stress of a load or pull, the strap will be drawn around the hook 3 and the end of the stud 8 will impinge against the cross bar 7 so that the strap will be securely fastened. With the smaller device, the end of the strap is inserted between the bars 2 and 7, around the hook 3 and through the loop of the snaphook, and then brought back under the bar 7. The stud 8 is then inserted through an opening in the end of the strap, and when the strap is put under tension or stress the end of the stud will be drawn against the cross bar 7 and the end of the strap firmly held. The head of the stud 8 will project under the cross bar 7 so that it will not tilt and cutting or splitting of the strap at a hole therein will be avoided.

It will be readily noted that the fastener frame will be held without sewing and the strap will be securely held in a very simple manner and may be readily released when desired. To release the strap, a pull is exerted upon the end of the strap sufficient to draw the stud 8 from the cross bar 7 and permit the stud to be extracted whereupon the strap may be withdrawn readily from the frame.

Having thus described the invention, what is claimed as new is:

1. A strap fastener comprising a frame having side bars, a cross bar at one end in hook form, a cross bar at the opposite end, an intermediate cross bar offset relative to the hook and the end cross bar, and a free stud engageable in the free end portion of a strap passed between the cross bars and around the hook to be drawn against the intermediate cross bar when the strap is under stress, said stud having a head normally disposed between adjacent plies of the strap.

2. A strap fastener comprising a frame having side bars, a cross bar at one end in hook form, a cross bar at the opposite end, an intermediate cross bar offset relative to the hook and the end cross bar, a second intermediate cross bar between the hook and the first-mentioned intermediate cross bar, a stud on said second-mentioned cross bar to engage and hold the end of a strap, and a free stud engageable in the free end portion of the strap passed between the cross bars and around the hook to be drawn against the intermediate cross bar when the strap is under stress.

3. A strap fastener comprising a frame having side bars and cross bars, and a headed stud to be engaged in a strap threaded through the frame and drawn against a cross bar of the frame when the strap is under stress, said cross bar having a notch in its edge in which the stud seats, said headed stud being adapted for removable engagement with the strap and to ride from exteriorly of the fastener to a position with the head disposed between adjacent plies of the strap.

OTTO CHRISTOFFERSEN.